June 17, 1947.                R. Q. ARMINGTON                2,422,460
                          TANDEM AXLE CONSTRUCTION
                     Filed Aug. 13, 1945          3 Sheets-Sheet 1
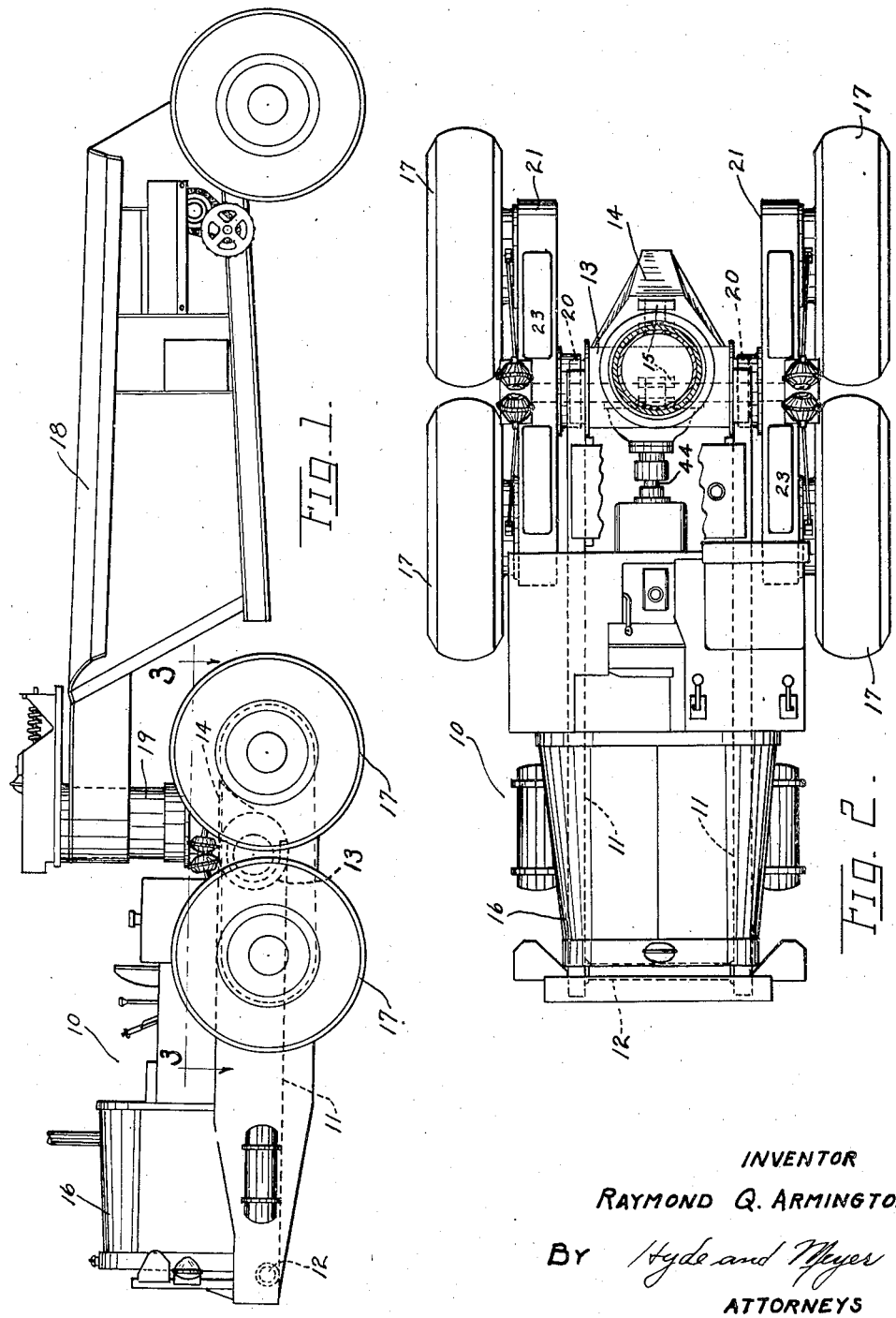
INVENTOR
RAYMOND Q. ARMINGTON
BY  Hyde and Meyer
        ATTORNEYS June 17, 1947.  R. Q. ARMINGTON  2,422,460
TANDEM AXLE CONSTRUCTION
Filed Aug. 13, 1945   3 Sheets-Sheet 2
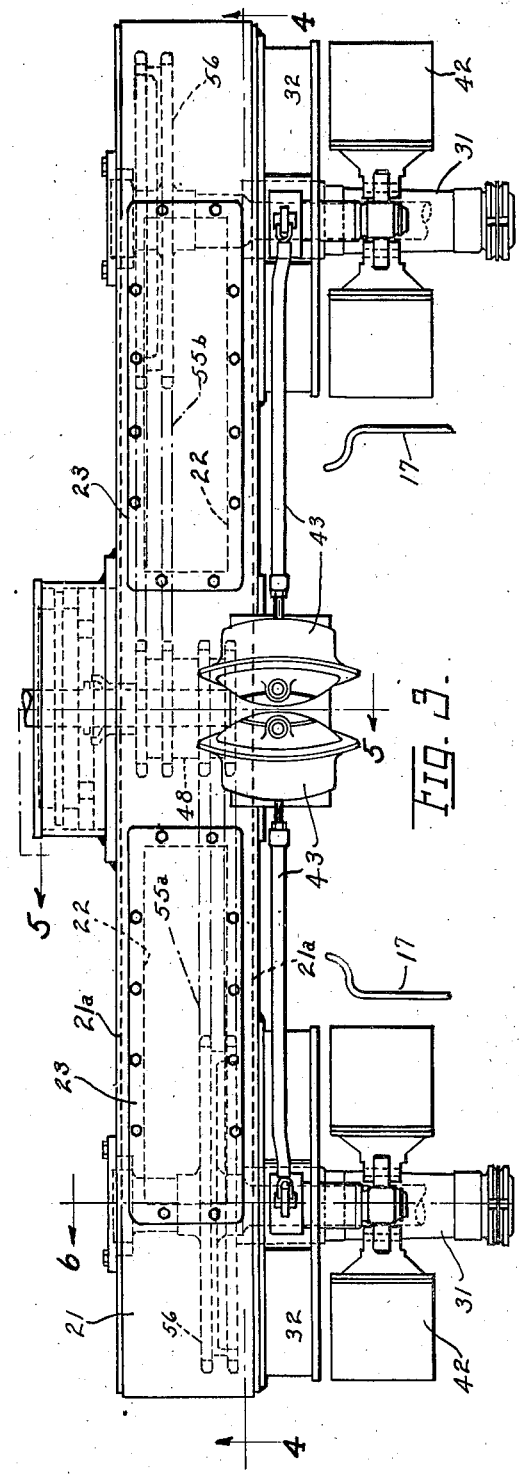
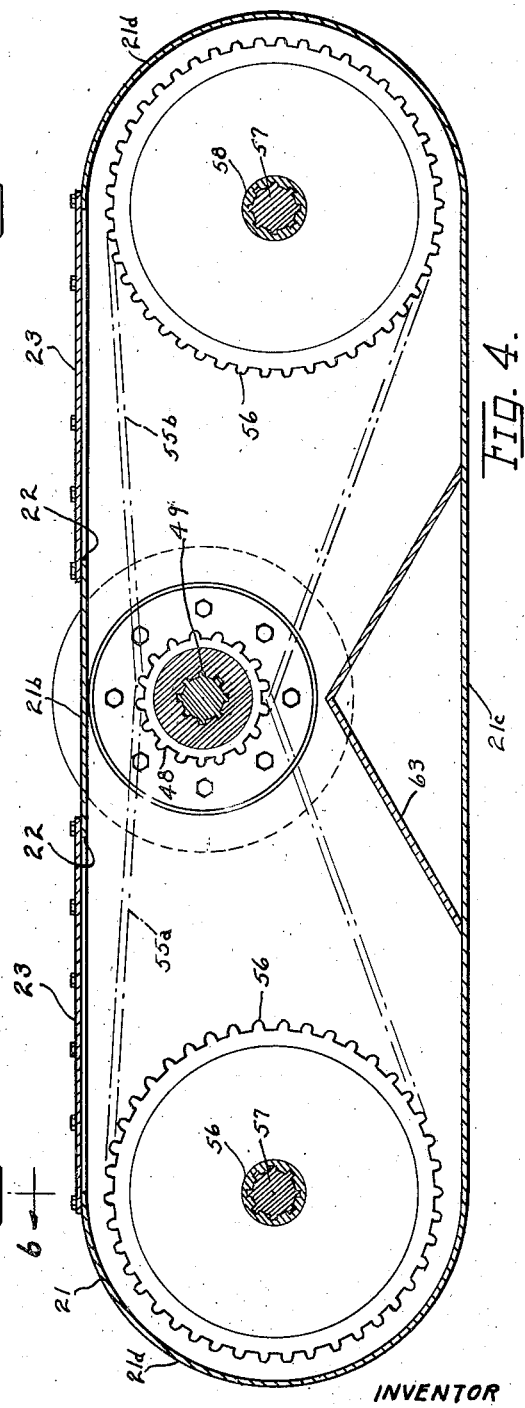
INVENTOR
RAYMOND Q. ARMINGTON
BY  Hyde and Meyer
ATTORNEYS

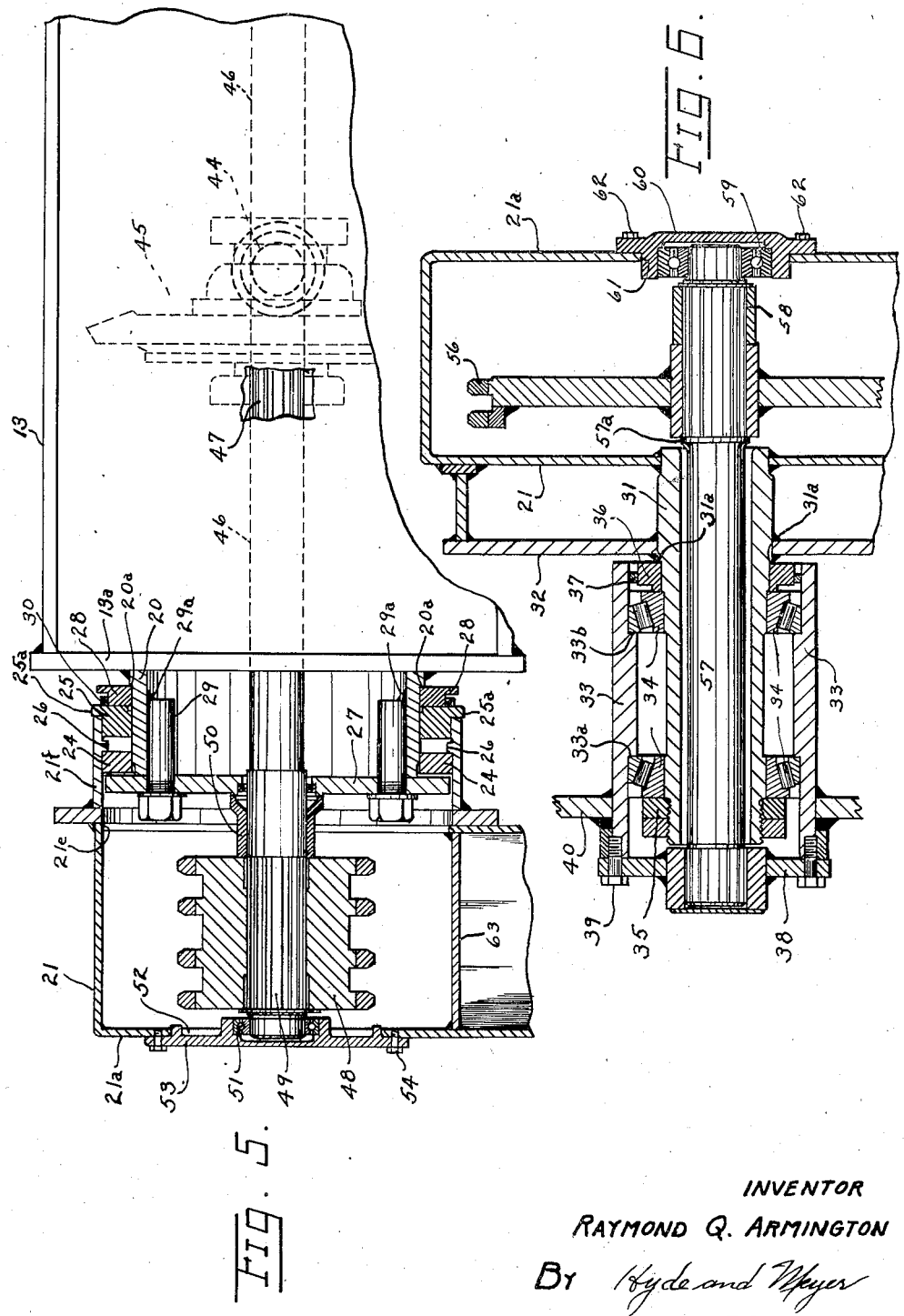

Patented June 17, 1947

2,422,460

UNITED STATES PATENT OFFICE 2,422,460

TANDEM AXLE CONSTRUCTION

Raymond Q. Armington, Shaker Heights, Ohio, assignor to The Euclid Road Machinery Co., Euclid, Ohio, a corporation of Ohio Application August 13, 1945, Serial No. 610,611

2 Claims. (Cl. 180—22)

This invention relates to improvements in tandem axle construction as applied to a tractor device of the type described.

An object of the present invention is to provide a tandem mounting of wheel-driving axles of an improved construction adapted for high speed operation. Prior devices of this type known to me have been satisfactory for slow speed operation, but several features of my device contribute to long life and satisfactory operation when the device is used at higher speeds.

One of the objects of the present invention is to provide a rocker beam construction for supporting wheel axles on opposite ends of the beam wherein the wheel driving axle means is called upon to transmit torsional stresses only, the bearing and bending loads being carried independently of the axle means.

The present invention provides a rocker beam having a trunnion mounting on the banjo axle housing with a full floating axle extending through the trunnion mounting into the rocker beam to drive the wheels.

Another object of the present invention is to provide spindles rigidly mounted on opposite ends of the rocker beam for mounting wheel means, with a full floating axle in each of the spindles carrying torsion loads only, the bearing and bending loads being carried independently of this axle.

Other objects of the invention include novel arrangements of bearing and thrust surfaces, a novel construction of certain of the full floating axles described, together with simplified construction for cheap and efficient assembly and maintenance of the various parts as will more clearly appear from the accompanying drawings and description, and the essential features thereof will be summarized in the appended claims.

In the drawings,

Fig. 1 is a side elevational view of a tractor device constructed according to my invention with a trailer wagon mounted thereon to indicate one use of my invention;

Fig. 2 is a top plan view of the tractor device of Fig. 1 with the trailer device omitted for clarity;

Fig. 3 is a fragmental plan view enlarged, taken along the line 3—3 of Fig. 1;

Fig. 4 is a sectional view taken along the line 4—4 of Fig. 3; while

Figs. 5 and 6 are enlarged fragmental sectional views taken along the similarly numbered lines of Fig. 3. The brake operators have been omitted for clearness.

As best seen in Figs. 1 and 2, I have shown my invention as applied to a tractor 10 having a frame whose main members include two side frame members 11 rigidly connected by a cross tube 12 at the front and rigidly connected by the banjo axle housing 13 near the rear end of the side frame members. The tail piece 14 is rigidly connected at the rear end of the frame for a purpose forming no part of the present invention. Mounted directly above the axle housing 13 is means 15 for connecting the hitch carrying the trailer vehicle, but since this has no bearing on the present invention, further description will be omitted here. The engine 16 is mounted on the tractor frame in a manner to overhang the wheel means 17. This overhanging weight is counterbalanced by the weight of the trailer vehicle 18 which is transmitted to the tractor through the hitch means 19. It results from this construction that a large portion of the weight of the tractor and trailer is concentrated on the drive wheels 17 so that my device has great tractive power. Also, I find that a device constructed according to this disclosure has good riding and steering characteristics.

The present invention concerns itself chiefly with the construction of the wheel means and the mounting and driving of the same. Rigidly mounted on opposite ends of the housing 13 are drums 20 secured by any suitable means such as the welding indicated at Fig. 5 which connects the drum with the end plate 13a of the housing 13. Since the construction at each end of the housing 13 is exactly the same, one only need be described.

The rocker beam 21 is of hollow box-like construction having parallel side walls 21a, a top wall 21b, a bottom wall 21c, and semicircular end walls 21d. The plate 63 is a brace between side walls 21a. In the top wall are provided front and rear openings 22 which are closed by the removable cover plates 23. These are for access to the parts as will later appear. In the side wall 21a, nearest the tractor, is a circular opening 21e around the outer edge of which is secured the sleeve 21f which is rigidly connected to the side wall 21a as by welding indicated in Fig. 5. This sleeve surrounds and is spaced radially outward from the drum 20 previously mentioned.

Referring now to Fig. 5, the sleeve 21f is mounted for oscillation about the drum 20 by means of the bearing collars 24 and 25 whose outer circumferences engage the inner face of sleeve 21f and whose inner circumferences engage the drum 20. Thus the bearing load of rocker beam 21 is transmitted directly to the drum 20. A rib 26, extending radially inwardly on the inner face of sleeve 21f, holds the collars 24 and 25 separated. A shoulder 25a on the collar 25 receives the innermost edge of sleeve 21f so as to limit the inward movement toward the tractor of the collar 21f as will presently appear. The bending loads are taken by the thrust collars 27 and 28 which are rigidly positioned on the drum 20. The collar 27 is bolted to the studs 29 which in turn are welded, as indicated at 29a, to the inner face of drum 20. The collar 27 engages the collar 24 which in turn is held by the rib 26 so as to limit movement of the sleeve 21f away from the housing 13. The collar 28 is seated in a shoulder 20a of the drum 20. This collar 28 bears against the collar 25, and thus movement of the sleeve 21f inwardly toward the housing 13 is prevented. A dirt seal 30 is provided to prevent dirt entering between the engaging faces of the collars 25 and 28. Thus the bearing and bending loads of the rocker beam 21 are carried independently of the wheel drive means later described.

Means is provided on each rocker beam 21 for the mounting of wheels 17, one forwardly and one rearwardly of the axis of oscillation of the rocker beam. These wheel mountings are identical and therefore one only will be described. Referring to Figs. 3 and 6, a spindle 31 is rigidly connected to the outer wall of the rocker beam 21 as for instance by the welding shown in Fig. 6. Preferably, the spindle is further supported by the backing plate 32 which is also rigidly connected by welding to the rocker beam and supports the spindle at a point spaced outwardly from the rocker beam wall. The wheel hub 33 is rotatably mounted on the spindle by means of the bearings 34 so that all of the wheel load is carried directly on spindle 31. End thrust and bending loads are transmitted directly to the spindle by the means shown in Fig. 6. At the outer end of the spindle the bearing 34 is held by the shoulder 33a of the hub on the one hand and is held by the lock rings 35 threaded on the outer end of spindle 31. Thus a movement of the hub outwardly is prevented. At its inner end the bearing 34 rests against the shoulder 33b of the hub and is also held by the thrust collar 36 which engages in the shoulder 31a of the spindle. This limits inward movement of the hub. A dirt seal 37 is engaged between collar 36 and the inner end of hub 33 to prevent the entrance of dirt at this point. The outer end of the hub is closed by the hub cap 38 which is connected by bolts 39 to a driving flange 40 which is connected in the usual manner with the wheel 17 by means not shown.

A brake drum 42 is provided as shown in Fig. 3, and means for operating the brakes is shown at 43, but these have no connection with the present invention.

Drive means is provided for the wheels connected with the vehicle drive shaft 44, which is shown in Figs. 2 and 5. Through a suitable differential drive 45, the shaft 44 (which is driven by engine 16) drives two floating axle shafts 46 which extend out opposite ends of the housing 13 and into the rocker beams 21. These drives are identical, and, therefore, one only is shown. The axle 46 has a spline connection at 47 with the differential 45. At its outer end it carries a double sprocket 48 having the spline connection 49 with shaft 46. This sprocket is held in proper position by the spacer sleeve 50 which surrounds shaft 46 and bears against thrust collar 27. The outer end of shaft 46 is supported in bearing 51 which is carried by the outer vertical wall of the rocker beam 21. Preferably, also, a novel means is provided for holding this bearing. In the outer wall 21a of the rocker beam is provided an opening 52 sufficient to permit the sprocket 48 to pass in and out of the opening. A cover plate 53 is adapted to close this opening and is secured to the rocker beam by means of bolts or cap screws 54. The bearing 51, as shown in Fig. 5, may be carried by the cover plate 53. It results from this construction that upon removal of the cover plate 53 access is had to the bearing 51, the sprocket 48, and the shaft 46 so that any or all of these parts may be removed through the opening 52.

The drive for each of the wheels 17 is by way of chain connections from the sprocket 48 on each side of the tractor. As best seen in Figs. 3, 4, 5, and 6, a drive chain 55a extends forwardly from sprocket 48, and a drive chain 55b extends rearwardly. Each of these chains connects with an identical mechanism, and, therefore, one only will be described. Referring to Figs. 4 and 6, the chain 55b passes around sprocket 56 which has a spline connection with the inner end of axle 57. A spacer sleeve 58 bearing against the shoulder 57a on the axle 57 holds the sprocket 56 in the proper position. The axle 57 then passes through the spindle 31 and at its outer end has a spline connection with the hub cap 38. Thus each of the drive chains 55a or 55b drives its associated wheel 17 through one of the full floating axles 57. It will be noted that the axle 57 thus carries torsional stresses but carries none of the vehicle weight.

Each of the axles 57 is supported by bearings in a novel manner requiring only one axle bearing and permitting a reasonable amount of misalinement. At its inner end each axle 57 is provided with a bearing 59 carried by the inner vertical wall 21a of the associated rocker beam. As described in connection with the bearing 51, preferably the bearing 59 is carried by a cover plate 60 which closes an opening 61 through the wall of the rocker beam, the cover plate being held in place by cap screws 62. Obviously, upon removal of the hub cap 38, the axle 57 may be drawn outwardly. The outer end of axle 57 is supported through cap 38 and hub 33 on the bearings 34.

For access to the drive chains and to the sprockets 56, each rocker beam is preferably provided at each end with an elongated opening 22 through the top wall of the rocker beam. These openings are large enough to pass the sprockets 56. Each of these openings is closed by a removable cover plate 23.

My improved construction results in a great concentration of the weight of the tractor and trailer upon the four drive wheels 17. It also permits rapid movement over relatively rough ground because the two wheels 17 at each side of the tractor adjust themselves to uneven ground, independently of the wheels on the opposite side, by the rocking of the associated beam 21 upon its central trunnion. At the same time the wheel driving means is not subjected to the shocks usually associated with driving over rough ground because of the floating shafts 46 and the floating axles 57 all of which are independent of bending and bearing stresses and transmit the torsional stresses connected with the vehicle drive only.

What I claim is:

1. In wheeled vehicle construction wherein a rigid axle housing has a drum which oscillatably supports a rocker housing at an intermediate portion of the latter and wheels are carried at opposite ends of said rocker housing, means for mounting said rocker housing on its associated drum comprising a bearing sleeve rigid with said rocker housing and surrounding and radially spaced from said drum, a bearing ring between said bearing sleeve and said drum and substantially fixed against movement axially of said sleeve, and a thrust collar engaging said ring and substantially fixed against movement axially of said drum.

2. In wheeled vehicle construction wherein a rigid axle housing has a drum which oscillatably supports a rocker housing at an intermediate portion of the latter and wheels are carried at opposite ends of said rocker housing, and wherein a floating axle shaft in said axle housing extends into said rocker housing and there supports a wheel driving member, there being an opening through the outer wall of said rocker housing axially alined with said axle shaft, the combination of a removable plate closing said opening, and a bearing for said axle shaft mounted on said plate, said bearing providing the sole support for the outer end of said axle shaft.

RAYMOND Q. ARMINGTON.

REFERENCES CITED

The following references are of record in the file of this patent:

UNITED STATES PATENTS

| Number | Name | Date |
|---|---|---|
| 1,608,069 | Lacey et al. | Nov. 23, 1926 |
| 1,902,712 | Leipert | Mar. 21, 1933 |
| 1,741,425 | Masury | Dec. 31, 1929 |
| 1,627,225 | Babel et al. | May 3, 1927 |
| 2,082,826 | Frisby | June 8, 1937 |

FOREIGN PATENTS

| Number | Country | Date |
|---|---|---|
| 440,800 | Great Britain | Dec. 30, 1935 |